(12) United States Patent
Kucera et al.

(10) Patent No.: US 6,751,936 B2
(45) Date of Patent: Jun. 22, 2004

(54) LAWN MOWER STARTING ASSEMBLY AND BAIL

(75) Inventors: Jeffrey R. Kucera, Parma Heights, OH (US); Kent Smith, Cleveland, OH (US)

(73) Assignee: MTD Products Inc., Valley City, OH (US)

( * ) Notice: Subject to any disclaimer, the term of this patent is extended or adjusted under 35 U.S.C. 154(b) by 165 days.

(21) Appl. No.: 10/033,563

(22) Filed: Oct. 19, 2001

(65) Prior Publication Data

US 2002/0073671 A1 Jun. 20, 2002

Related U.S. Application Data

(60) Provisional application No. 60/241,951, filed on Oct. 20, 2000.

(51) Int. Cl.[7] ............................................... A01D 69/00
(52) U.S. Cl. ........................................ 56/10.8; 56/10.5
(58) Field of Search ................................. 56/10.8, 10.5, 56/11.3, 11.4, 11.7; 123/185.14; 74/7 R, 7 C; 185/41 A

(56) References Cited

U.S. PATENT DOCUMENTS

| | | | |
|---|---|---|---|
| 3,134,375 A | | 5/1964 | Schurra |
| 3,324,842 A | | 6/1967 | Haas |
| 4,216,363 A | | 8/1980 | Nofel |
| 4,466,232 A | * | 8/1984 | Beugelsdyk et al. ......... 56/10.8 |
| 4,667,459 A | * | 5/1987 | Scanland et al. ............ 56/11.3 |
| 5,235,943 A | | 8/1993 | Fiorenza, II |
| 5,784,868 A | | 7/1998 | Wadzinski |
| 5,934,052 A | | 8/1999 | Kamm |
| 6,047,614 A | * | 4/2000 | Beugelsdyk et al. ....... 74/502.2 |
| 6,230,678 B1 | | 5/2001 | Gracyalny et al. |
| 6,386,169 B1 | | 5/2002 | Gracyalny et al. |

FOREIGN PATENT DOCUMENTS

| | | |
|---|---|---|
| FR | 1245802 | 10/1960 |
| JP | 56147035 | 3/1983 |
| WO | WO 00/26531 | 5/2000 |

* cited by examiner

*Primary Examiner*—Árpád Fábián Kovács
(74) *Attorney, Agent, or Firm*—Brouse McDowell; Roger D. Emerson; Timothy D. Bennett

(57) ABSTRACT

An apparatus for starting an engine comprises a frame and an internal combustion engine operatively mounted to the frame. A control member is operatively connected to the frame, wherein the control member has an activated position and a deactivated position. The control member adapted to complete an engine circuit when in the activated position. An energy storage medium is operatively associated with the engine such that release of energy stored in the energy storage medium turns the engine and facilitates its starting. A starting assembly is utilized to release the stored energy in the energy storage medium. As such, an operator must utilize two separate and distinct actions, activating the control member and activating the starting assembly, to restart the internal combustion engine.

4 Claims, 14 Drawing Sheets

LAWN MOWER STARTING ASSEMBLY AND BAIL

This patent application claims priority from a Provisional Patent Application filed on Oct. 20, 2000, having Ser. No. 60/241,951.

BACKGROUND OF THE INVENTION

1. Field of Invention

This invention pertains to the art of internal combustion engines, and more particularly to the art of methods and apparatuses for easily starting such internal combustion engines, and most specifically, in the preferred embodiment, a method and apparatus for easily starting an internal combustion engine mounted on a lawn and garden apparatus, such as a lawn mower, a snow thrower, a chipper/shredder, a tiller, or other types of lawn and garden devices powered by internal combustion engines.

2. Description of the Related Art

It is well known to affix an internal combustion engine to a lawn and garden apparatus. It is also known to affix a handle to such apparatuses so that an operator can direct an apparatus over the desired portion of the lawn or garden. It is known to affix throttle mechanisms to the handle of such apparatuses. It is also known to affix a bail to such handles to provide an "operator present" safety feature.

However, it has not heretofore been known to provide an apparatus and method for starting an internal combustion engine by means of a bail and, an optional throttle control, and a starting assembly mounted on a handle.

It is important to understand that the invention has equal applicability to a wide variety of products powered by internal combustion engines having power outputs ranging from 1 horsepower to 15 horsepower. The invention is most applicable and generally designed for lawn mowers with horsepower ranges small enough to be typically started by hand, i.e., without the benefit of an electric starter. In the typical application, the operator must pull on a string or cable, which is wrapped around the flywheel of the engine. As the operator pulls on the cable, the cable unwinds, perhaps a length of five feet. As it unwinds, the rope turns the engine, causing the spark plug to fire and, hopefully, creating enough compression, spark, fuel, etc. to start the engine. Sometimes, the operator must pull on the cable more than once, even several times, in order to start the engine.

Because of the physical effort involved in starting an engine by way of a pull cable, some operators have difficulty starting the engine. Others are simply physically unable to generate the force necessary to pull hard enough on the pull cable to start the engine. Because of this problem, persons that are generally less strong, for example smaller people, females, elderly, or those suffering from shoulder and arm injuries, may not be able to operate the lawn and garden apparatus without assistance. For operators who generally have the strength and endurance to continually pull the pull cable, the present invention is convenient.

The Briggs & Stratton Corporation made an important development in this area when they developed an engine, which was introduced in the year 2000. This engine utilized a spring within a canister to store energy generated by the engine flywheel. In essence, the engine needed to be started the first time by the pull cable. However, when the engine was stopped, for example by turning the engine off, the flywheel driven by the engine possessed a certain amount of momentum. The Briggs & Stratton invention utilized this energy possessed by the flywheel to start the engine the next time. The brake was applied to the flywheel so that energy was transferred from the flywheel to a relaxed spring. The spring was mounted within a canister. As the braking mechanism slowed revolutions of the flywheel, the spring was coiled within the canister. By this mechanism, kinetic energy from the flywheel was stored as potential energy within the coiled spring. The next time the operator wanted to start the engine, the energy stored in the coiled spring was sufficient to cause the engine to turn and for the combustion process to begin.

The applicant believed that improvements were desirable in the system designed by Briggs & Stratton. The applicant then invented what is believed to be an improved method and apparatus for starting the Briggs & Stratton engine. That improved method and apparatus would be discussed as follows.

SUMMARY OF THE INVENTION

An apparatus and method for starting an engine is provided. An apparatus comprises a frame and an internal combustion engine operatively mounted to the frame. A control member is operatively connected to the frame, wherein the control member has an activated position and a deactivated position. The control member is adapted to complete an engine circuit when in the activated position. An energy storage medium is operatively associated with the engine such that release of energy stored in the energy storage medium turns the engine and facilitates its starting. A starting assembly is utilized to release the stored energy in the energy storage medium. Accordingly, it is an object of the present invention to provide an apparatus and method for starting an internal combustion engine, which requires an operator to utilize two separate and distinct actions, activating the control member and activating the starting assembly, to restart the internal combustion engine.

It is yet another object of the present invention to provide an apparatus, wherein the control member is a bail.

Another object of the present invention is to provide an apparatus, wherein the energy storage medium is a canister assembly comprising a spring within a canister, the spring being adapted to absorb kinetic energy from a flywheel of the engine when the engine is disabled.

Further, another object of the present invention is to provide an apparatus, wherein the starting assembly further comprises a cable operatively associated with the frame, the cable having a first end and a second end, the second end of the cable being connected to the energy storage medium, wherein stored energy is adapted to be released when a predetermined amount of force places tension on the cable.

Yet, another object of the present invention is to provide an apparatus, wherein the apparatus further comprises a handle operatively mounted to the frame, and the starting assembly further comprises a hook attached to the handle, the cable adapted to pass through the hook, and a cap attached to the first end of the cable, the cap adapted to maintain the cable within the hook.

Still another object of the present invention is to provide an apparatus, wherein the control member is a bail, the apparatus further comprising a handle operatively mounted to the frame, the starting assembly further comprising:

a U-shaped rod having a first end and a second end, the second end attaching the bail to the handle;

a button having a stem extending therefrom, the stem attaching to the rod; and, a bracket attached to the first end of the rod, the bracket extending upwardly and outwardly from the first end, the bracket having a receiving means, the cable connected to the bracket, the receiving means adapted to engage the stem.

Another object of the present invention is to provide an apparatus, wherein the control member is a bail, the apparatus further comprising a handle operatively mounted to the frame, the starting assembly further comprising:

a U-shaped bracket having the cable attached thereto, the U-shaped bracket having legs extending therefrom, each of the legs having at least one hole defined therein for receiving the bail;

first biasing means for biasing the U-shaped bracket in a substantially upright position;

a second bracket fixedly attached to the bail, the bracket having a top and a bottom, the top and the bottom having an aperture defined therein;

a button operatively connected to the second bracket, the button having a stem attached thereto, the apertures receiving the stem, the stem adapted to be positioned in an interfering relationship with the U-shaped bracket when the button is depressed; and, second biasing means disposed between the top and bottom of the second bracket, the biasing means biasing the button and the stem in a substantially upright position.

Yet another object of the present invention is to provide an apparatus, wherein the first biasing means is a spring, the second biasing means is a spring, and the second spring adapted to receive the stem of the button.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
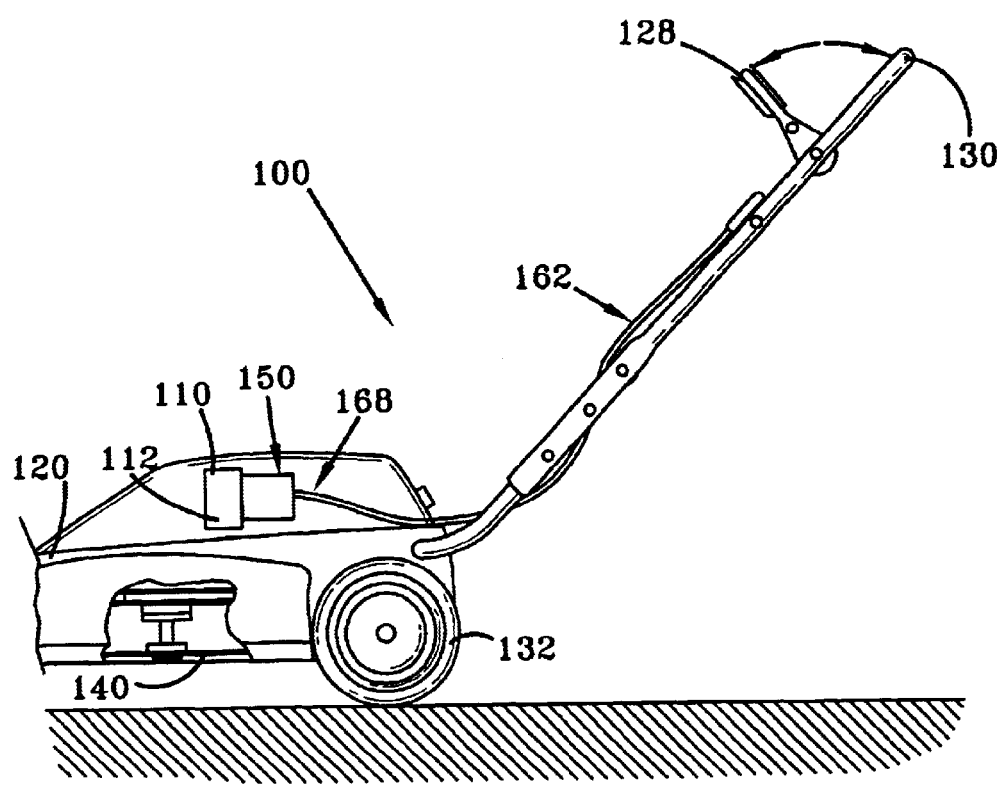
FIG. 1 is a side elevational view of a lawn care vehicle with a schematic representation of the canister assembly.

Referring now to the drawings wherein the showings are for purposes of illustrating a preferred embodiment of the invention only and not for purposes of limiting the same, the present invention is illustrated in FIGS. 1–14.

With reference to FIGS. 1–15, the inventive method and apparatus will be disclosed in the context of a walk-behind lawn mower. However, as already stated earlier in this specification, the invention is not limited to lawn mowers or the specific embodiments shown in the FIGURES. The lawn mower 100 features an internal combustion engine 110, a deck 120, a handle 130, and wheels 132. Beneath the deck 120, as shown in the cut away FIG. 1, is one or more blades 140 which are rotated by the engine 110. Mounted onto the handle 130 is a bail 128, which may be spring biased.

In operation to start the engine 110, the bail 128 performs two functions. First, the bail 128 completes the associated engine circuit and allows power to be transferred to the engine 110 and, secondly, the bail 128 unlocks the throttle to facilitate the transfer of fuel to the engine 110. However, for the engine 110 to start, energy must be transferred to the spark plug to cause the spark plug to fire. This invention utilizes a spring within a canister system 150 designed by Briggs & Stratton Corporation of Milwaukee, Wis. This canister system 150 provides the energy needed to turn a flywheel 112 of the engine 110, and thus, start the engine 110. The canister system 150 is operatively connected to both the engine 110 and a starting assembly 160.

In operation to start the engine 110, both the starting assembly 160 and the bail 128 must be activated to start the engine 110. Activation of the starting assembly 160 causes the energy stored in the canister system 150 to be released so that the spark plugs can be fired. While, activation of the bail 128 completes the associated engine circuit and opens the throttle so that fuel can flow to the engine 110. Therefore, a user must use a first hand to activate the starting assembly 160 and a second hand to activate the bail 128. Since both of the user's hands must be on the handle 130 to start the mower 100, this increases the safety of the mower 100.

Figure 2:
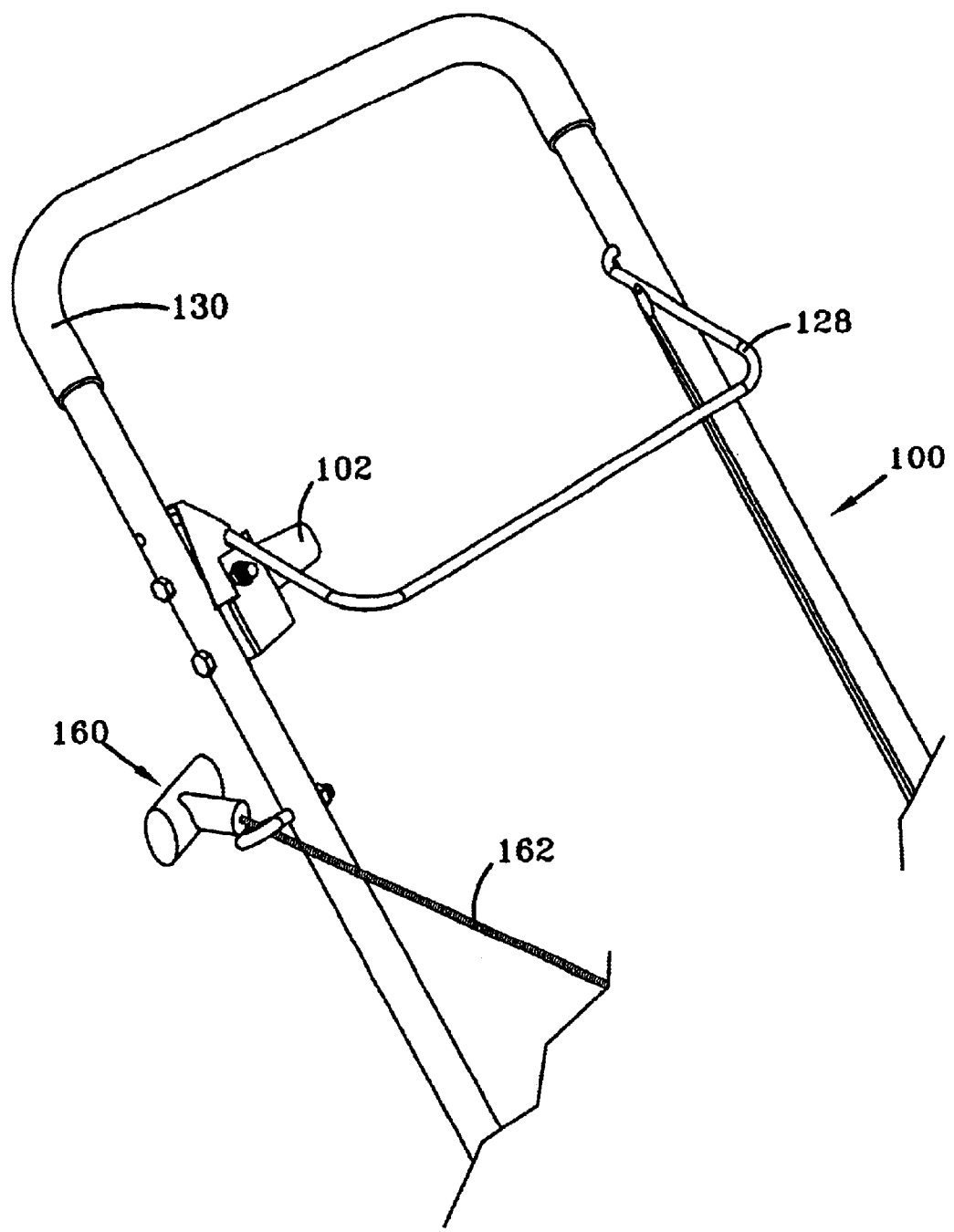
FIG. 2 is a perspective view of a first embodiment of the starting assembly showing a bail lock out feature, a hook and a cap.
Figure 3:
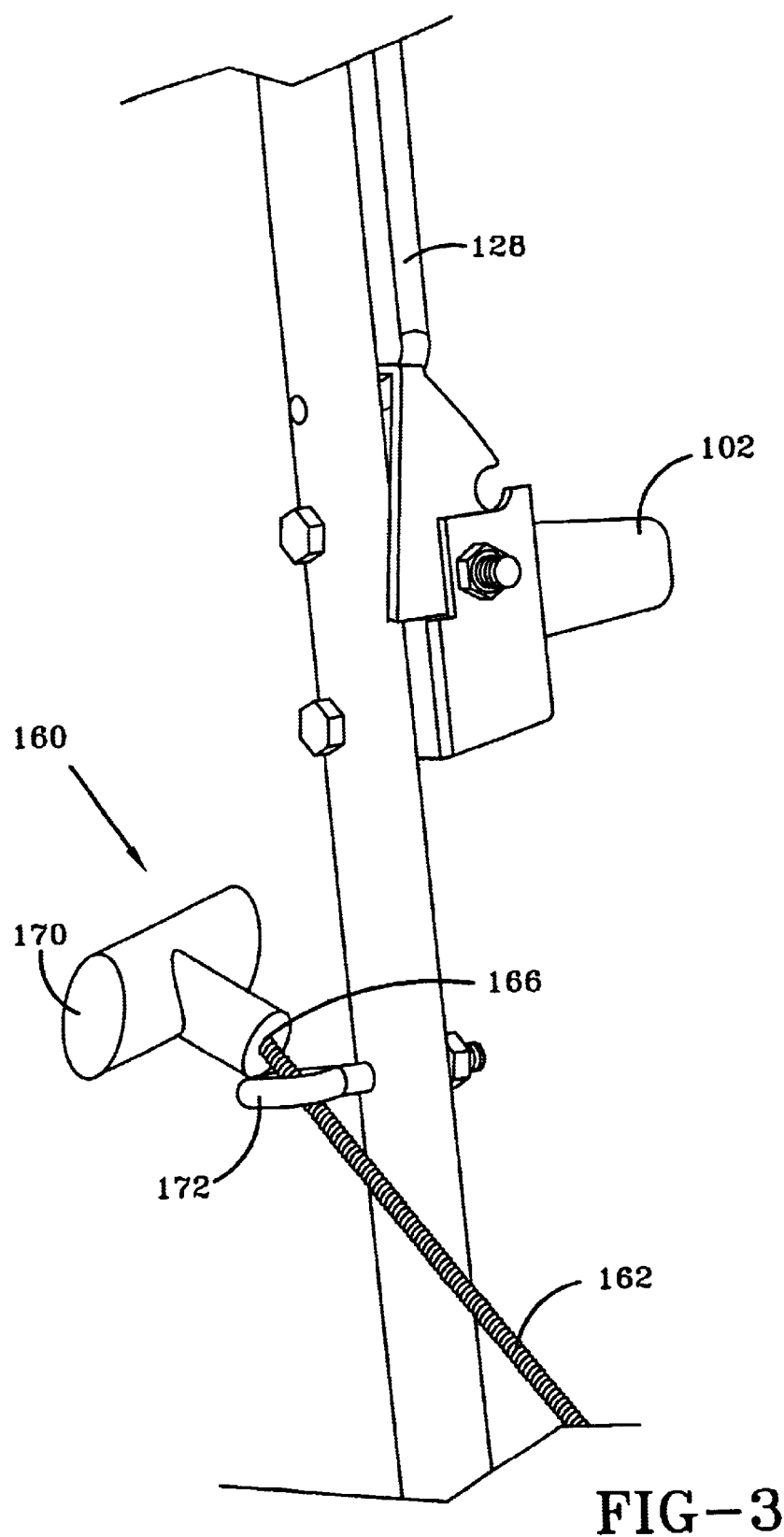
FIG. 3 is an enlarged view of the starting assembly shown in FIG. 2 wherein the bail is in the activated position.
Figure 4:
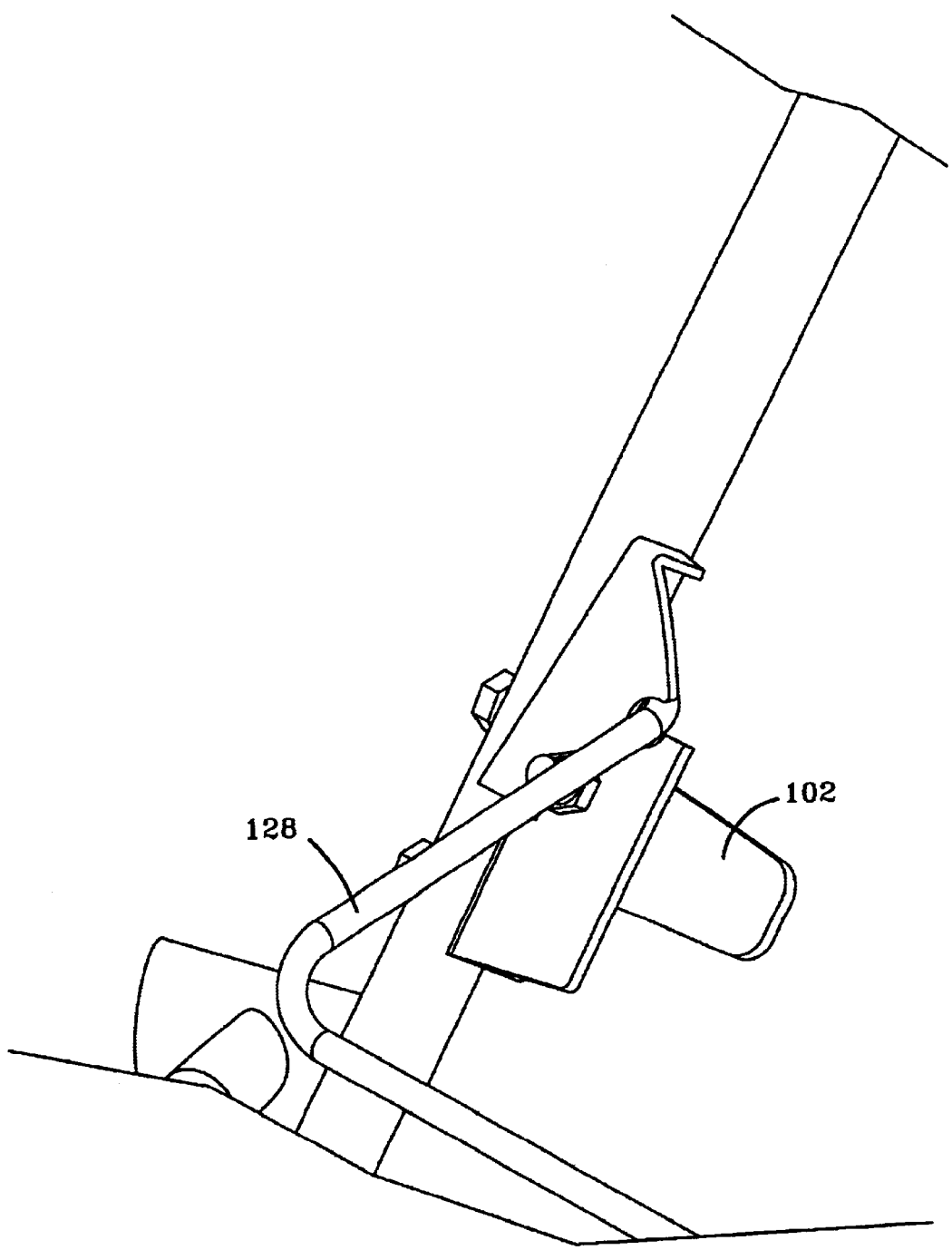
FIG. 4 is an enlarged view of the starting assembly shown in FIG. 2 wherein the bail is in the deactivated position.

With reference to FIGS. 2–4, the first embodiment of the starting assembly 160 features a bail 128 mounted onto a handle 130 with a lock out feature 102. The method of operation is that the operator would first move the lock out feature 102 to a second position as shown in FIG. 3. This enables the bail 128 to be depressed. The bail 128 was then depressed and, by that mechanism, the energy in the spring was released and the engine would start.

Still viewing FIGS. 2–4, the starting assembly 160 includes cable 162, such as a nylon cord, having first and second ends 166, 168, a cap 170 attached to the first end 166 of the cable 162, and a hook 172 attached to the handle 130. The second end 168 of the cable 162 is connected to the canister system 150, as shown in FIG. 1, and extends upwardly therefrom and through the hook 172. The cap 170 prevents the cable 162 from slipping through the hook 172. When the starting assembly 160 is in its inactivated state, there is no tension on the cable 162 and, thus, the canister system 150 is not activated. However, the starting assembly 160 can be activated by pulling on the cap 170 in an upward direction to place tension on the cable 162, which causes the energy stored within the canister assembly 152 to be released.

Figure 5:
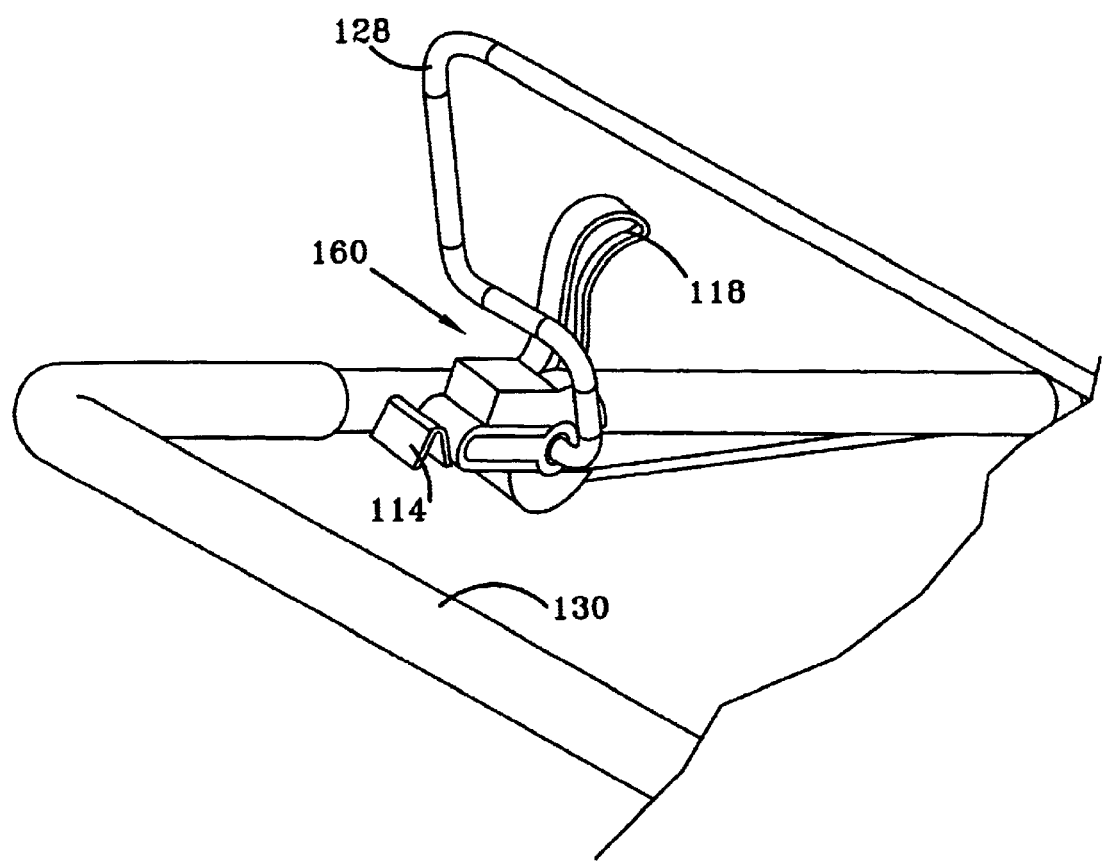
FIG. 5 is a perspective view of a second embodiment of the starting assembly illustrating a lock out trigger and a trigger lever in a first position such that fuel cannot flow to the engine.
Figure 6:
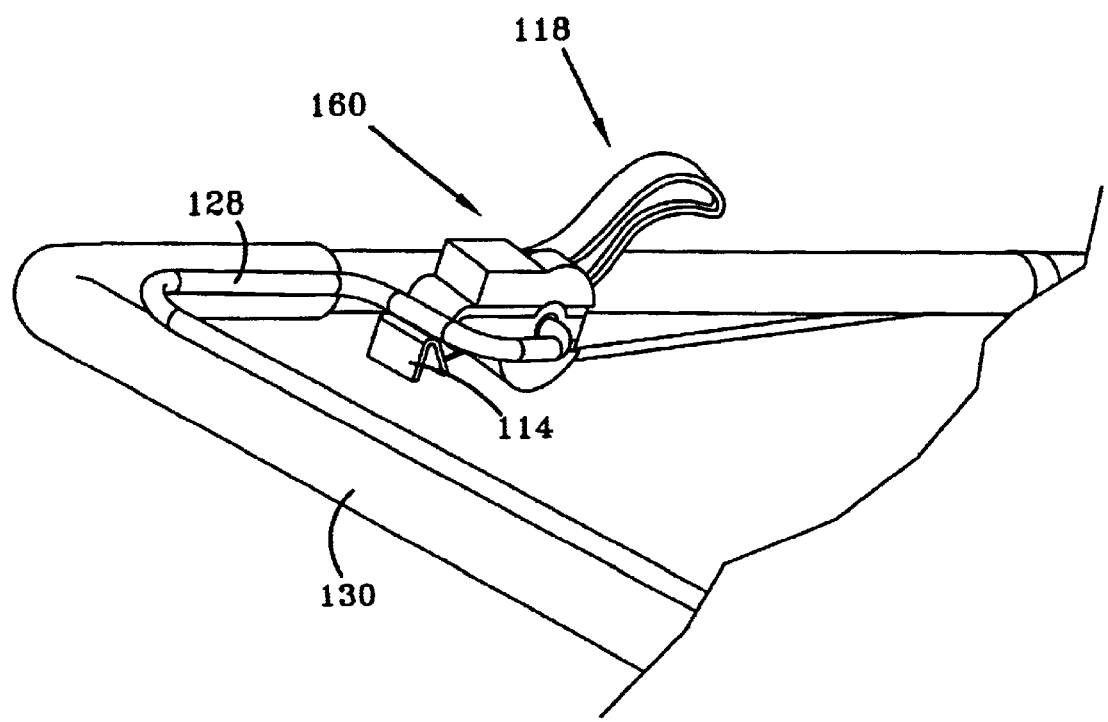
FIG. 6 is another perspective view of the starting assembly showing the lock out trigger and the trigger lever in the second position to enable fuel flow.
Figure 7:
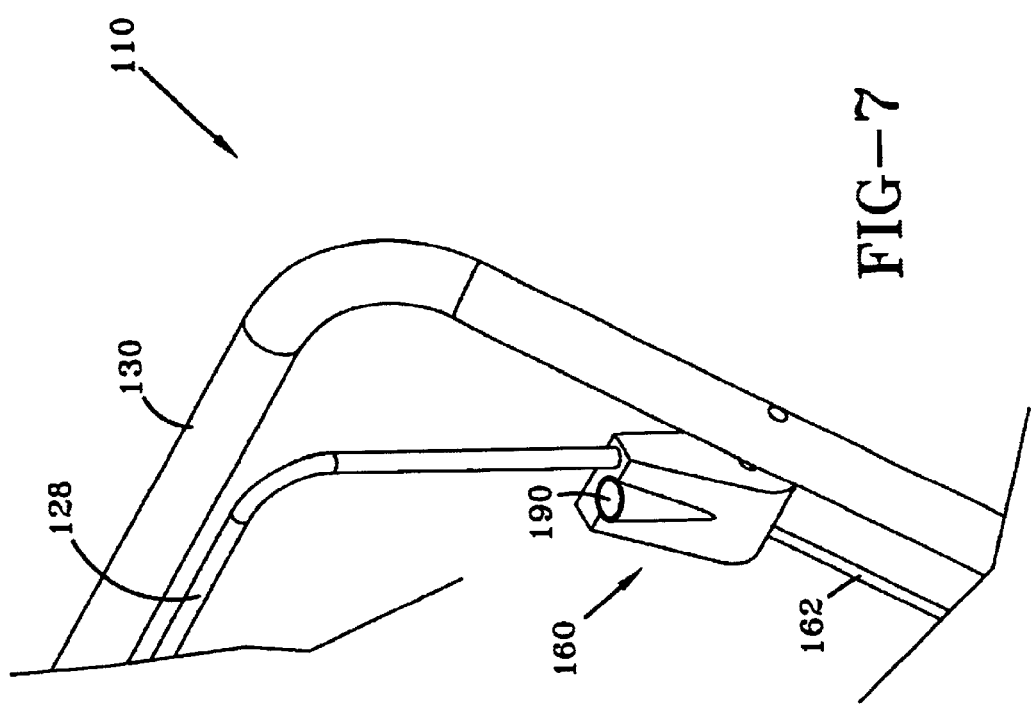
FIG. 7 is a perspective view of a third embodiment of the starting assembly in a deactivated position.
Figure 8:
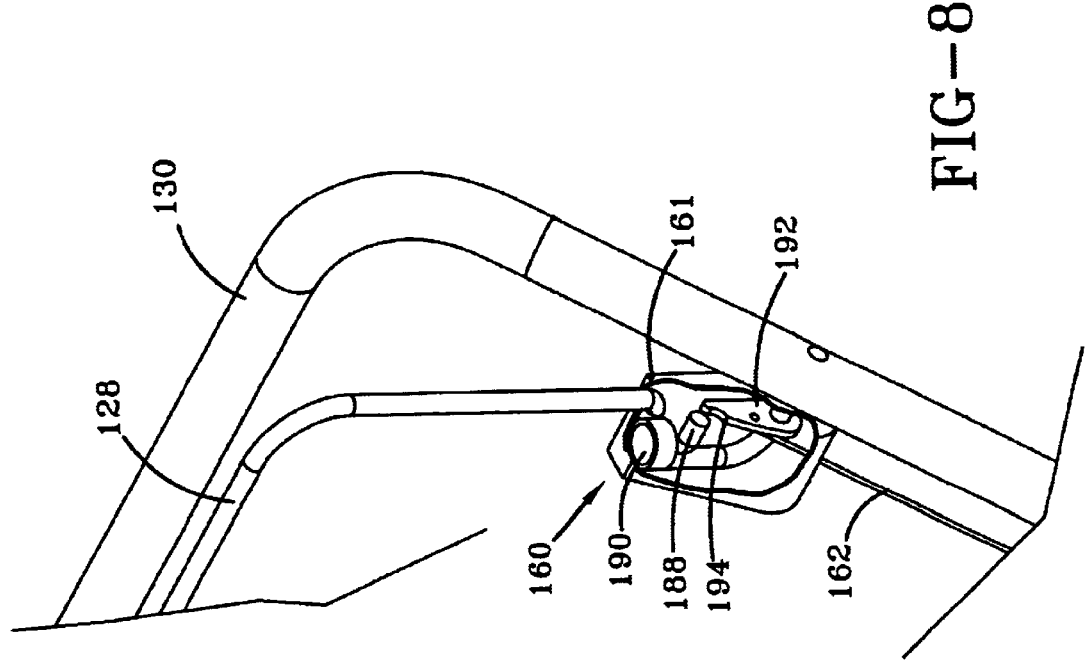
FIG. 8 is a perspective view of the third embodiment of the starting assembly showing the button being slightly depressed.
Figure 9:
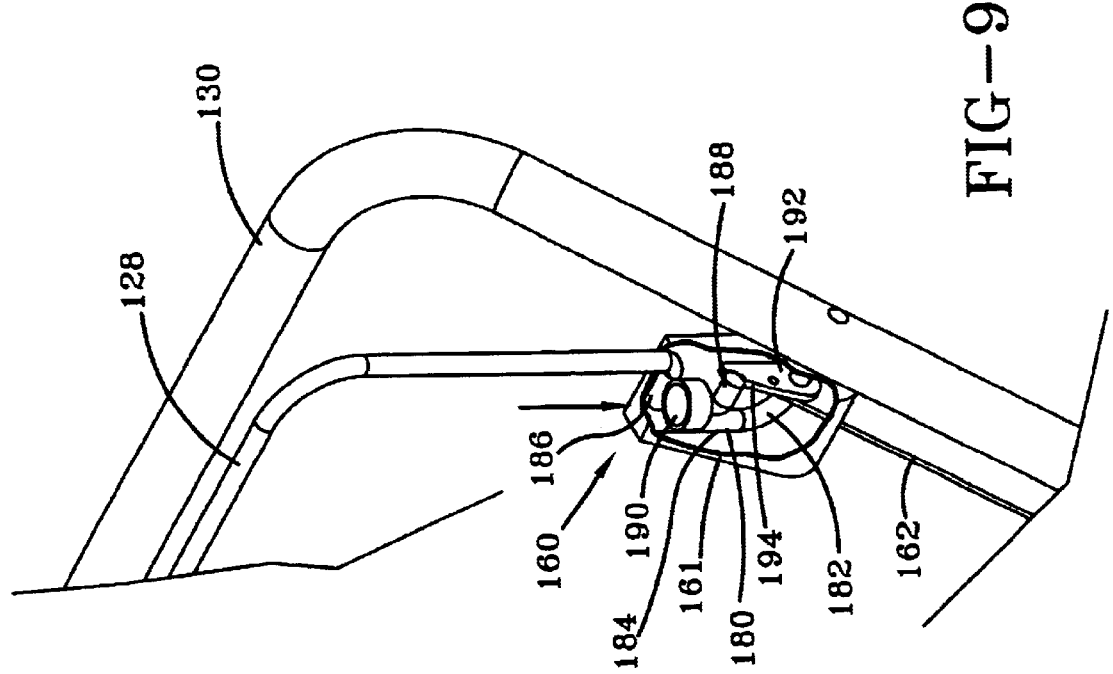
FIG. 9 is another perspective of the third embodiment of the starting assembly showing the receiving means engaging the first member of the button.
Figure 10:
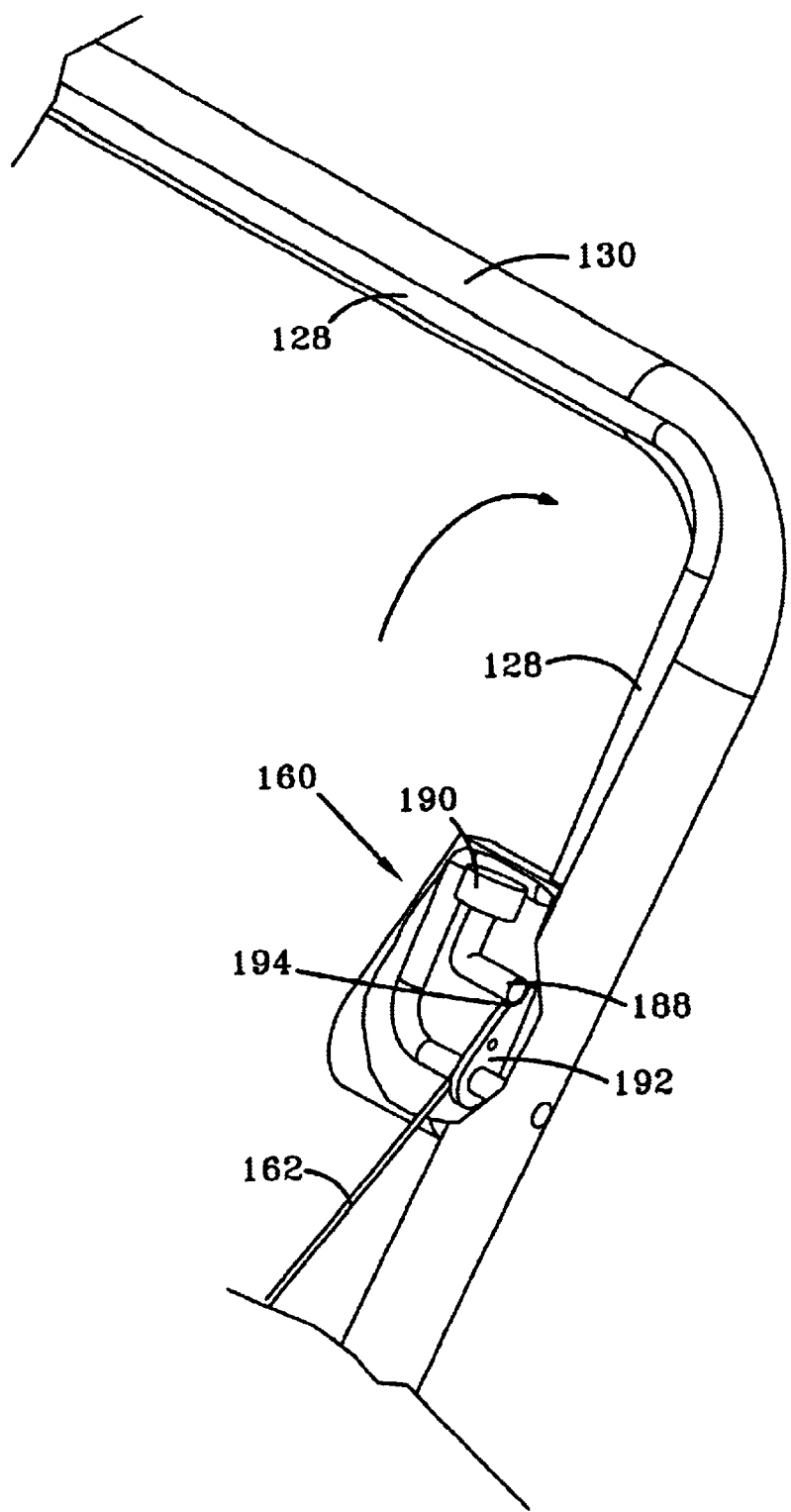
FIG. 10 is yet another perspective view of the third embodiment of the starting assembly showing the bail rotating the first receiving member of the starting assembly to release stored energy from the energy storage medium.
Figure 11:
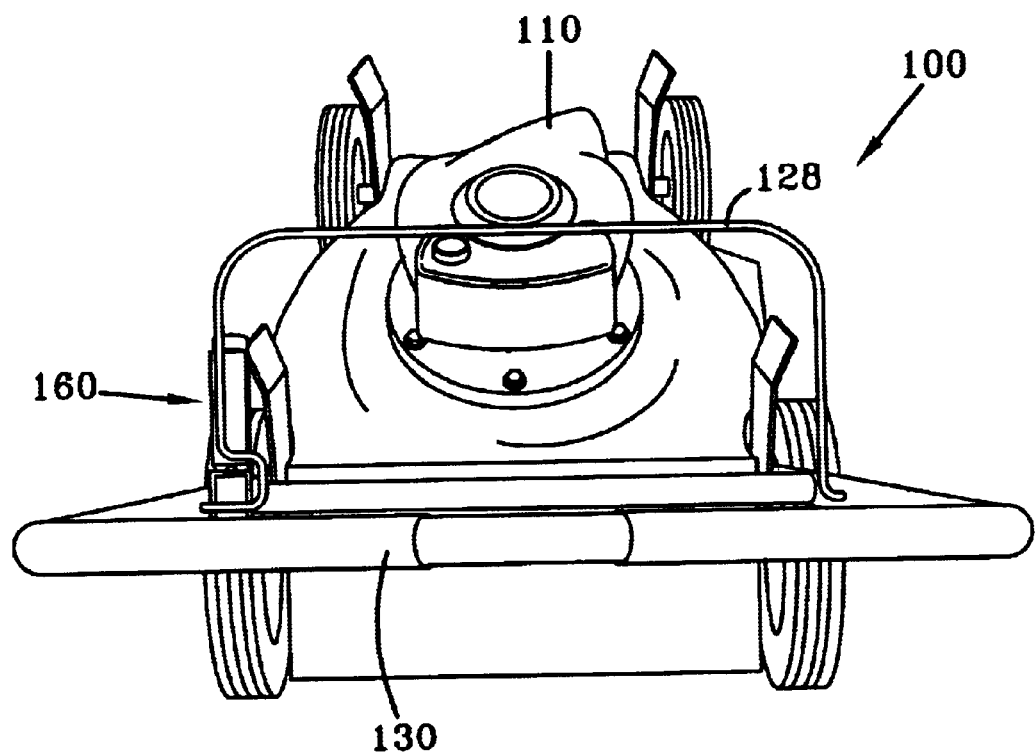
FIG. 11 is a top perspective view of the fourth embodiment of the starting assembly mounted to the frame of a lawn care vehicle.
Figure 12:
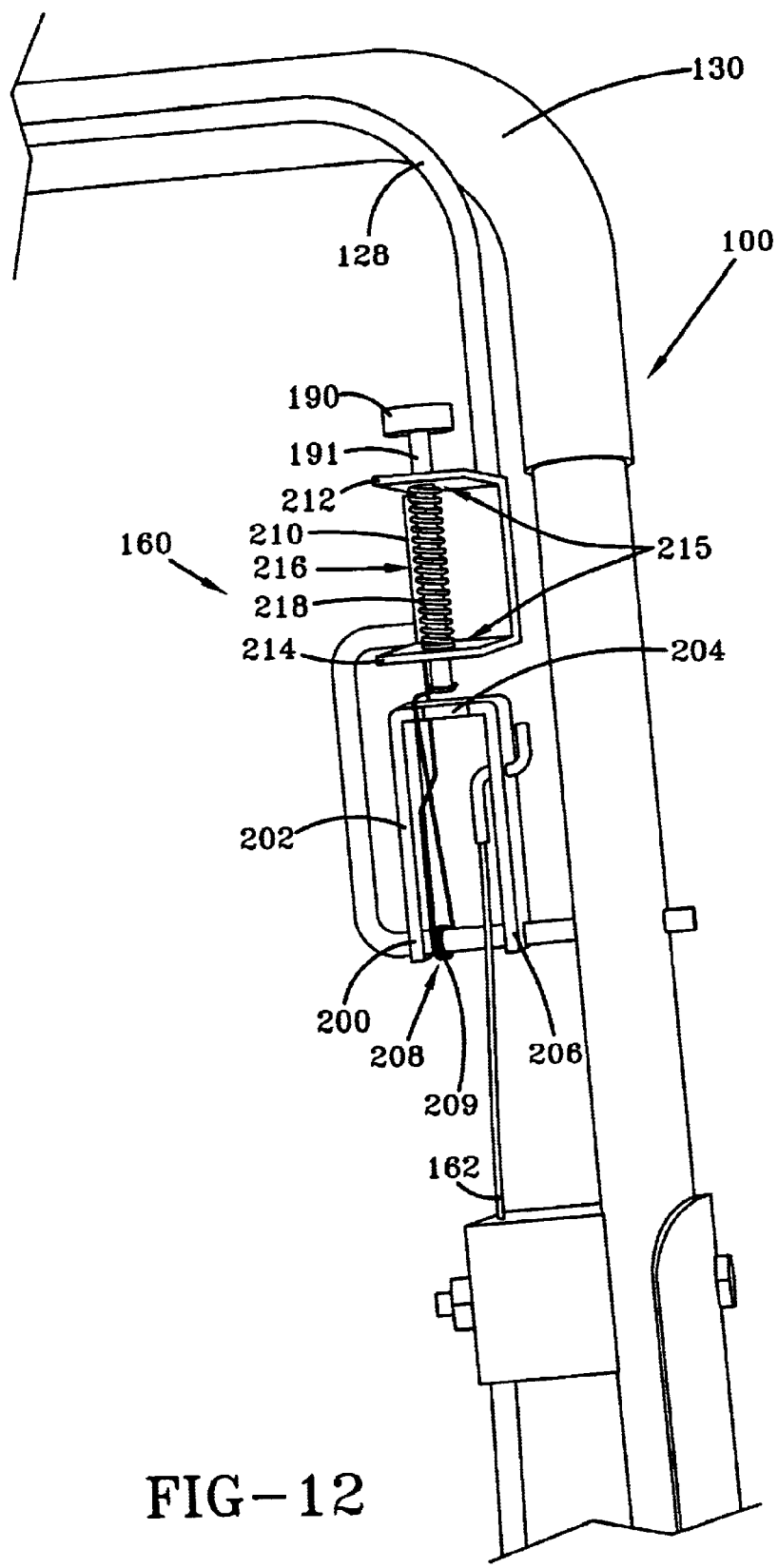
FIG. 12 is a perspective view of a fourth embodiment of the starting assembly showing the stem of the button in a non-interference position with the U-shaped bracket.
Figure 13:
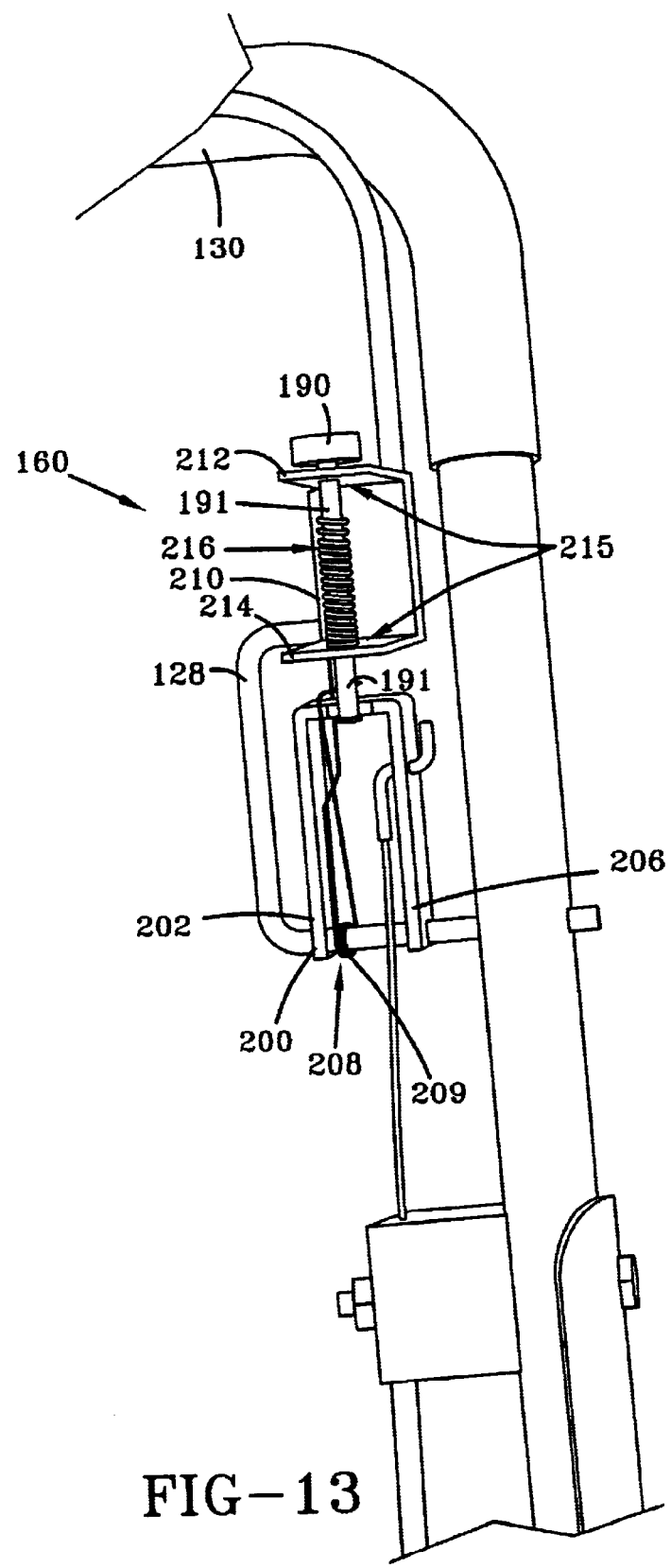
FIG. 13 is another perspective view of the fourth embodiment of the starting assembly showing the stem of the button in an interference position with the U-shaped bracket.
Figure 14:
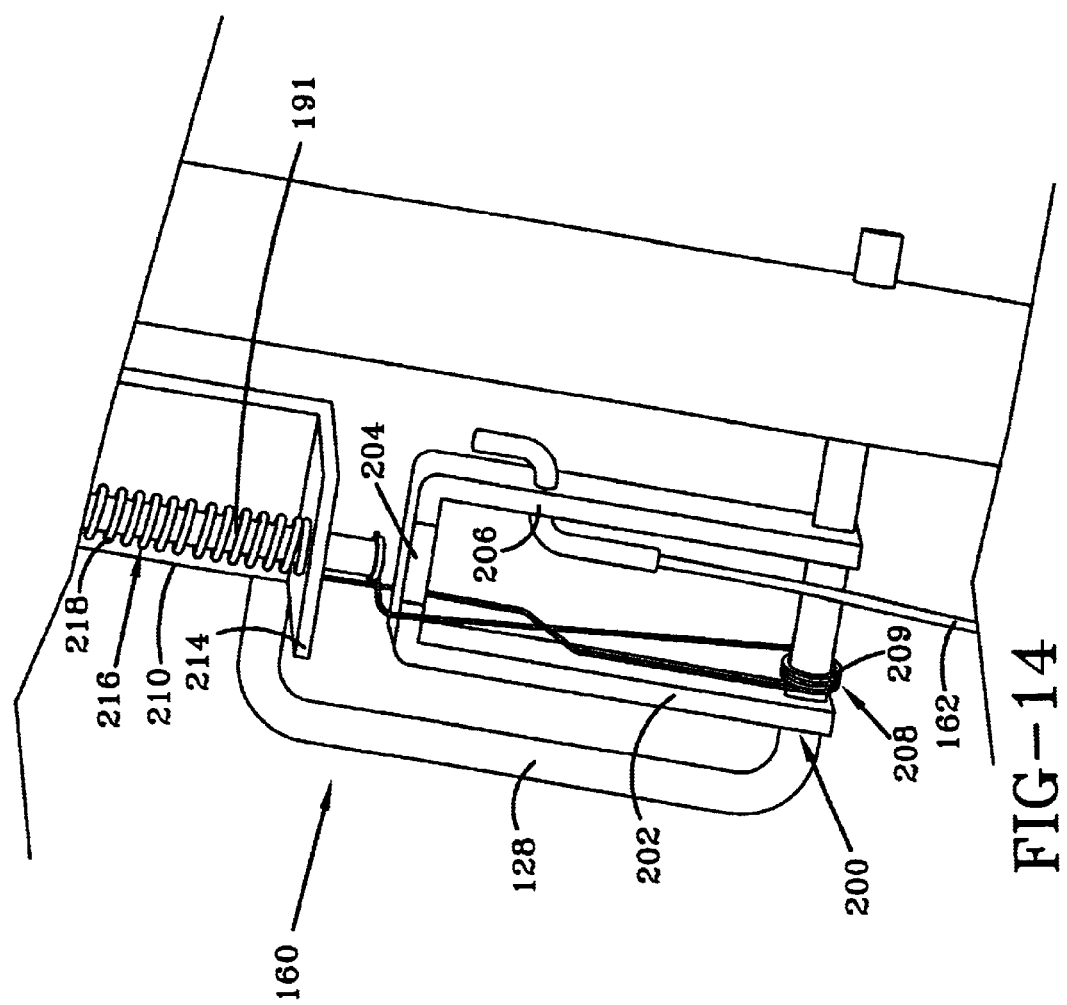
FIG. 14 is enlarged perspective view of the fourth embodiment of the starting assembly shown in FIG. 12.

With reference to FIGS. 5 and 6, a second embodiment of the starting assembly 160 is shown. In this embodiment, a starting assembly 160 is mounted to the handle 130. The starting assembly 160 includes lock out trigger 114. In normal operation, the bail 128 moves from a first position as shown in FIG. 5 to a second position as shown in FIG. 6. When the bail 128 is in the second position, it contacts the handle 130; however, the engine 110 does not start. The bail 128 moves the lock out trigger 114 from a first position, as shown in FIG. 5, to a second position as shown in FIG. 6. The lock out trigger 114 functions to enable the throttle to be opened. When the lock out trigger 114 is in the first position, as shown in FIG. 5, a mechanical lock (not shown) prevents a throttle lever 118 from being moved from a first position, as shown in FIG. 5, to a second position as in FIG. 6. The throttle lever 118 may be spring-loaded. When the throttle lever 118 is in the first position, no fuel flows to the engine 110. However, when the throttle lever 118 is moved away from the handle 130 and into the second position, or positions between the first position and the second position, various amounts of fuel flow to the engine 110. As illustrated in FIG. 6, when the throttle lever 118 is in the second position, the engine 110 is being provided the maximum prescribed amount of fuel. When the bail is released, the throttle lever 118 and the lock out trigger 114 return to their first positions as shown in FIG. 5, which stops the engine 110.

In operation to start the engine 110, the bail 128 is rotated towards the handle 130 as shown in FIG. 6. The bail 128 contacts and pushes the lock out trigger 114 downward. The mechanical lock releases the throttle lever 118 such that the throttle lever 118 can be selectively rotated. Next, the throttle lever 118 is moved forward, meaning away from the handle 130, which enables various amounts of fuel to flow to the engine 110. Once the throttle lever 118 achieves a position to permit fuel to flow to the engine 110, energy is released from the energy storage medium 150 to restart the engine 110. Releasing the bail 128 causes the throttle lever 118 to return to its original position shown in FIG. 5.

With reference to FIGS. 7–10, a third embodiment of the starting assembly 160 is shown. In this embodiment, only the starting assembly 160 and the bail 128 are mounted onto the handle 130. However, the starting assembly 160 and the bail 128 perform the same functions that they performed in the first embodiment, namely, the starting assembly 160 releases the energy stored in the canister system 150 and the bail 128 completes the associated engine circuit and unlocks the throttle to allow fuel to flow to the engine 110.

The primary difference between the first, second and third embodiments is the design of the starting assembly 160. The starting assembly 160 is comprised of a U-shaped rod 180 having a first end 182, a middle 184, and a second end 186 that attaches the bail 128 to the handle 130. The rod 180 is operatively attached to a first member 188 having a button 190. The button 190 causes the first member 188 to extend in an outward direction toward the handle 130 when the button 190 is depressed. A bracket 192 having a first receiving means 194 is attached to the first end 182 of the rod 180 and extends upwardly and outwardly therefrom. The cable 162, which attaches the canister system 150 to the starting assembly 160, is connected to the bracket 192.

In operation to start the engine 110, the bail 128 is depressed towards the handle 130 to complete the associated engine circuit and unlock the throttle. However, the engine cannot be started by just depressing the button 190. When the button 190 is depressed, the bail 128 is also rotated in the direction of the handle 130. However, the housing 161 surrounding the starting assembly 160 is sufficiently large enough so that rotation of the bail 128 will not cause the bracket 192 to rotate. It is the rotation of the bracket 192, which is attached to the cable 162 that applies tension to the cable 162 and thereby causes the canister system 150 to release its stored energy. The bracket 192 is only rotated when the button 190 is depressed. When the button 190 is depressed, the first member 188 extends outwardly which engages the first receiving member 194 of the bracket 192. Once the first member 188 engages the first receiving member 194 of the bracket 192, rotation of the bail 128 will also cause rotation of the bracket 192. This rotation causes tension to be applied to the cable 162, which also causes the canister system 150 to release its energy.

In operation to start the engine 110, the button 190 must be depressed before the bail 128 is activated. If the bail 128 is activated first, the first member 188 will have been rotated away from the first receiving member 194 and, thus, the first member 188 cannot engage the first receiving member 194 to activate the canister system 150.

Accordingly, in this embodiment, a user must also have both hands positioned on the handle 130 to start the mower 100. The user must use a first hand to depress the button 190 of the starting assembly 160. In addition, the user must use a second hand to depress the bail 128.

With reference to FIGS. 11–14, a fourth embodiment of the starting assembly 160 is shown. Except for the design of the starting assembly 160, this embodiment is very similar to the third embodiment since it also requires a two-step process of pressing the button 190 and then pulling a bail 128 back, in order to start the engine 110. The starting assembly 160 also includes a housing (not shown), which is very similar to the housing shown in FIG. 8.

Still viewing FIGS. 11–14, the starting assembly 160 is comprised of a first U-shaped bracket 200 having a first end 202, a middle 204, and a second end 206. The cable 162 is attached to the U-shaped bracket 200. The cable 162 is operatively associated with the handle 130. As shown in the FIGURES, the cable 162 runs down the length of the handle 130 and connects to the engine 110. At the lower end of the first and second ends 202, 206 of the U-shaped bracket 200, holes are defined therein and receive the bail 128. A first biasing means 208 fits around the bail 128 between the first and second ends 202, 206 of the bracket 200. As shown in FIGS. 11–14, the first biasing means 208 may be a spring 209, which biases the bail 128, including the button 190 to the bracket 200. The cable 162 exerts attention on this bracket 200 biasing it toward a substantially upright position.

Above the U-shaped bracket 200, the button 190 with a stem 191 is positioned onto the bail 128. This button 190 and stem 191 are received within a second bracket 210 that is fixedly attached to the bail 128. This second bracket 210 has a top 212 and a bottom 214, each with an opening 216 that receives the button stem 191. Between the top 212 and the bottom 214 of the second bracket 210, a second biasing means 216, which could also be a spring 218, receives the button stem 191. This spring 218 biases the button 190 and stem 191 toward a substantially upright position. When the button 190 is pressed, the lower end of the stem 191 extends into an interference position with the U-shaped bracket 200.

In operation to start the engine 110, both the bail 128 and the starting assembly 160 must be activated to start the mower 100. The bail 128 can be depressed without depressing the button 190, but this will not supply tension to the cable 162 and, thus, the energy in the canister system 152 will not be released. The engine 110 can only be started by first activating the starting assembly 160 and then depressing the bail 128. To start the engine 110, the operator first presses the button 190. This causes the button stem 191 to extend in front of the U-shaped bracket 200. While holding the button 191 down, and, therefore, holding the interference between the button 190 and the U-shaped bracket 200, the operator pulls the bail 128 backwards towards the handle 130. This increases the tension in the cable 162, permitting the mower engine 110 to start. It should be noted that, once the bail 128 is pulled back to the running condition, the biasing of the first spring 209 maintains the button stem 191 into its extended position. It should be noted that, if the operator does not press the button 190, the bail 128 can still be moved backwards towards the handle 130. However, the U-shaped bracket 200, in this condition, does not move back and, therefore, the engine 110 is not started. If the engine 110 has been started and is running, with the bail 128 in the forward back position, and the operator lets go of the bail 128, both the bail 128 and the U-shaped bracket 200 are pulled forward and the engine 110 is stopped. Accordingly, a user must use both hands to start the engine 110, which allows for safe starting of the engine 110.

The invention has been described with reference to preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:
What is claimed is:

1. A lawn care apparatus, comprising:
   a frame;
   an internal combustion engine operatively mounted to said frame;
   a handle operatively mounted to said frame;
   a bail operatively connected to said handle, said bail having an activated position and a deactivated position, wherein said bail is adapted to complete an engine circuit when in said activated position;
   an energy storage medium operatively associated with said engine such that release of energy stored in the energy storage medium turns said engine and facilitates its starting;
   a starting assembly for releasing said stored energy in said energy storage medium, wherein said starting assembly further comprises:
      a cable operatively associated with said frame, said cable having a first end and a second end, said second end of said cable being connected to said energy storage medium, wherein stored energy is adapted to be released when a predetermined amount of force places tension on said cable;
      a U-shaped rod having a first end and a second end, said second end attaching said bail, to said handle;
      a bracket attached to said first end of said rod, said bracket extending upwardly and outwardly from said first end, said bracket having a receiving means, said first end of said cable connected to said bracket, said stem adapted to engage said receiving means; and
   a button having a stem extending therefrom, said stem engaging said bracket.

2. The lawn care apparatus of claim 1, wherein said lawn care apparatus is a lawn mower.

3. A lawn care apparatus, comprising:
   a frame;
   an internal combustion engine operatively mounted to said frame;
   a handle operatively mounted to said frame;
   a bail operatively connected to said handle, said bail having an activated position and a deactivated position, wherein said bail is adapted to complete an engine circuit when in said activated position;
   an energy storage medium operatively associated with said engine such that release of energy stored in the energy storage medium turns said engine and facilitates its starting;
   a starting assembly for releasing said stored energy in said energy storage medium, wherein said starting assembly further comprises:
      a cable operatively associated with said frame, said cable having a first end and a second end, said second end of said cable being connected to said energy storage medium, wherein stored energy is adapted to be released when a predetermined amount of force places tension on said cable;
      a U-shaped bracket having said first end of said cable attached thereto, said U-shaped bracket having a first end and a second end extending therefrom, each of said legs having at least one hole defined therein for receiving said bail;
      a first spring for biasing said U-shaped bracket in a substantially upright position;
      a second bracket fixedly attached to said bail, said bracket having a top and a bottom, said top and said bottom having an aperture defined therein;
      a button operatively connected to said second bracket, said button having a stem attached thereto, said apertures receiving said stem, said stem adapted to be positioned in an interfering relationship with said U-shaped bracket when said button is depressed; and,
      a second spring disposed between said top and bottom of said second bracket, said second spring biasing said button and said stem in a substantially upright position, said stem disposed within said second spring.

4. The lawn care apparatus of claim 3 wherein said lawn care apparatus is a lawn mower.

* * * * *